US005659767A

United States Patent [19]

Nguyen et al.

[11] Patent Number: 5,659,767

[45] Date of Patent: Aug. 19, 1997

[54] APPLICATION PROGRAMMING INTERFACE FOR ACCESSING DOCUMENT ANALYSIS FUNCTIONALITY OF A BLOCK SELECTION PROGRAM

[75] Inventors: Thieu Quang Nguyen, Placentia; Mann Chang, Irvine, both of Calif.

[73] Assignee: Canon Information Systems, Inc., Costa Mesa, Calif.

[21] Appl. No.: 338,766

[22] Filed: Nov. 10, 1994

[51] Int. Cl.$^{6}$ .................................................. G06F 17/30

[52] U.S. Cl. ........................................ 395/777; 395/776

[58] Field of Search .................................. 395/500, 600, 395/776, 777; 382/16, 22; 364/419.19

[56] References Cited

U.S. PATENT DOCUMENTS

| | | | |
|---|---|---|---|
| 4,513,442 | 4/1985 | Scherl | 382/176 |
| 4,803,643 | 2/1989 | Hickey | 395/147 |
| 5,202,977 | 4/1993 | Pasetes, Jr. et al. | 395/500 |
| 5,465,304 | 11/1995 | Cullen et al. | 382/176 |

OTHER PUBLICATIONS

Fein, et al., "Model-based control strategy for document image analysis", Proceedings—SPIE–The International Society for Optical Engineering, vol. 1661, Feb. 10–12, 1992, pp. 247–256.

Yamada, et al., "Mixed Mode Document Processing System", IEE/IEICE Global Telecommunications Conference 1987, Nov. 15–18, 1987, pp. 30.2.1–30.2.5.

Tsujimoto, et al., "Understanding Multi-articled Documents", 10th International Conference on Pattern Recognition, Jun. 16–21, 1990, pp. 551–556.

*Primary Examiner*—Paul V. Kulik
*Assistant Examiner*—John C. Loomis
*Attorney, Agent, or Firm*—Fitzpatrick, Cella, Harper & Scinto

[57] ABSTRACT

An application programming interface accesses page analysis functionality of a block selection program and accesses data structures resulting therefrom. The application programming interface includes plural page analysis functionality which manipulate block selection functions including functions to analyze a document page, to create a hierarchical tree structure corresponding to the analyzed document page, and to return a pointer which is a block ID or a root node of the analyzed page. Plural hierarchical tree structure accessing functions traverse the hierarchical tree structure, and locate desired nodes in the hierarchical tree structure.

17 Claims, 7 Drawing Sheets

601

API FUNCTION LIBRARY

PAGE ANALYSIS FUNCTIONS — 602
- AnalyzePage — 603
- EndPageAnalysis — 604
- InitializePageAnalysis — 605
- BlockType — 606
- PageSkew — 607
- BlockBoundary — 608

NODE RELATIONSHIP FUNCTIONS — 609
- GetAllChildren/Descendants — 610
- GetDepth — 611
- GetNumberOfChildren/Descendants — 612
- GetParent — 613

TEXT BLOCK FUNCTIONS — 614
- GetFirstTextLine — 615
- GetLastTextLine — 616
- GetNextTextLine — 617

TABLE BLOCK FUNCTIONS — 618
- GetFirstTableCell — 619
- GetLastTableCell — 620
- GetNextTableCell — 621
- GetNumberOfCellsInTable — 622

LINE FUNCTIONS — 623
- GetLineInformation — 624

PICTURE FUNCTIONS — 625
- GetPictureInformation — 626

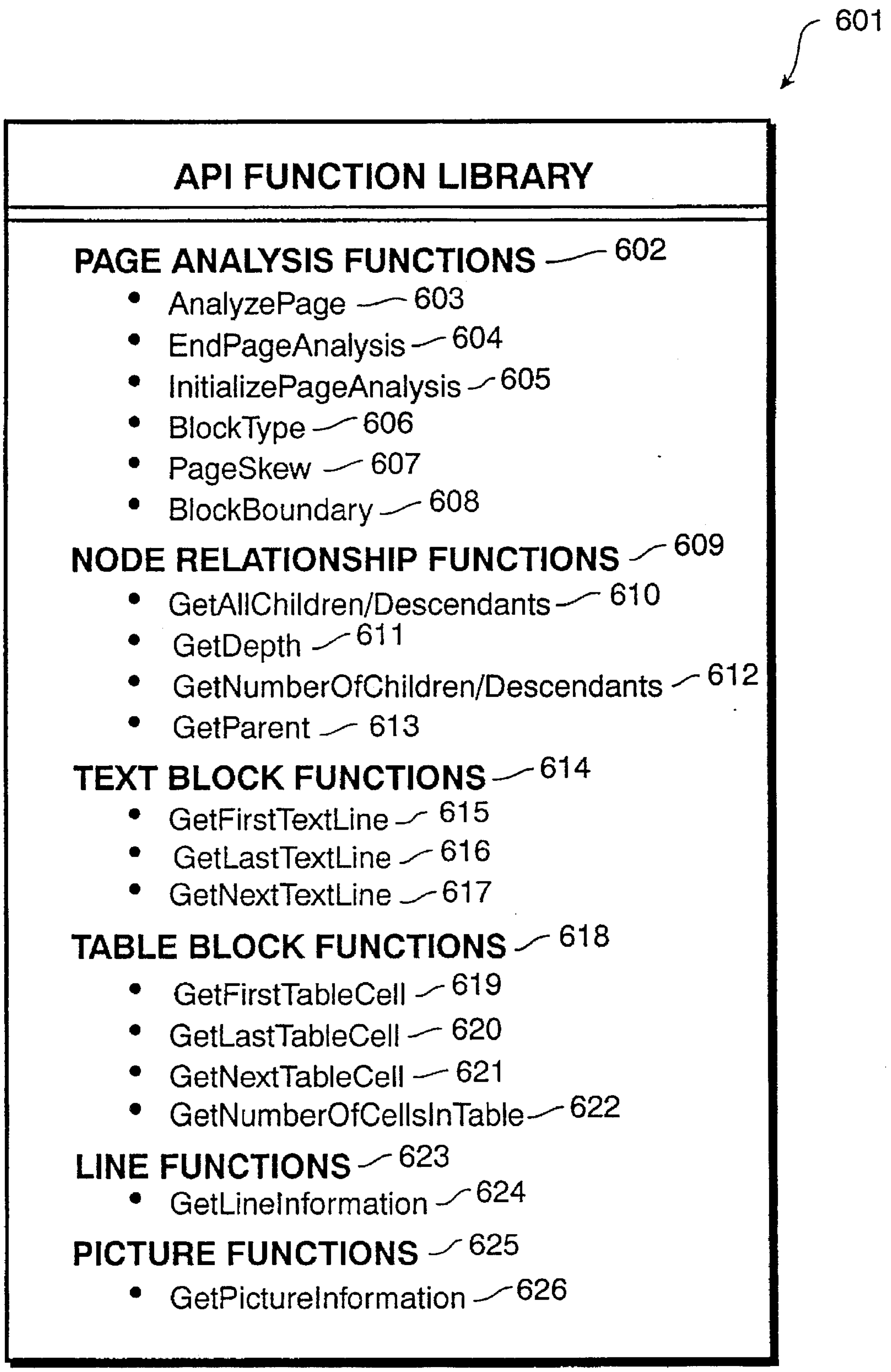

FIG. 6A

APPLICATION PROGRAMMING INTERFACE FOR ACCESSING DOCUMENT ANALYSIS FUNCTIONALITY OF A BLOCK SELECTION PROGRAM

BACKGROUND OF THE INVENTION

This application is being filed with an appendix of computer program listings.

A portion of the disclosure of this patent document contains material which is subject to copyright protection. The copyright owner has no objections to the facsimile reproduction by any one of the document or the patent disclosure, as it appears in the Patent and Trademark Office patent file or records, but otherwise reserves all copyright rights whatsoever.

FIELD OF THE INVENTION

The present invention relates to an application programming interface (API) for accessing document analysis functionality of a block selection program and for accessing the data structures resulting therefrom. More particularly, the present invention relates to a page analysis API library and a method for making a page analysis program utilizing the API library, whereby the functions in the API library can traverse and access data in a hierarchical tree structure resulting from a block selection technique.

INCORPORATION BY REFERENCE

U.S. applications Ser. No. 07/873,012, "Method And Apparatus For Character Recognition" Ser. No. 08/171,720, now U.S. Pat. No. 5,588,072, "Method And Apparatus For Selecting Text And/Or Non-Text Blocks In A Stored Document", and Ser. No. 08/338,781, "Page Analysis System", are incorporated herein by reference.

DESCRIPTION OF THE RELATED ART

Recently developed block selection techniques, such as the techniques described in U.S. patent application Ser. Nos. 07/873,012 and 08/171,720, automatically analyze images within a document page in order to distinguish between different types of image data within the document page. The result of such a block selection technique is used to determine the type of subsequent processing to be performed on the image, such as optical character recognition (OCR), data compression, data routing, etc. For example, image data which is designated as text data will be subjected to OCR processing while image data, which is designated as picture data, would not be subjected to OCR processing. As a result, the different types of image data can be input and automatically processed without an operator's intervention.

An example of how a block selection technique operates, such as the ones referenced above, will be discussed below with respect to FIGS. 1–3.

FIG. 1 shows the page of a representative document. Document page 101 is arranged in a two-column format. The page includes title 102, horizontal line 104, text areas 105, 106 and 107, which include lines of text data, halftone picture area 108, which includes a graphic image which is non-text, table 110, which includes text information, framed area 116, halftone picture area 121 accompanied by caption data 126, and picture areas 132 and 135 accompanied by caption data 137. According to the block selection techniques described in U.S. patent application Ser. Nos. 07/873,012 and 08/171,720, now U.S. Pat. No. 5,588,072 the disclosures of which are hereby incorporated by reference, each area of document page 101 is designated in accordance with a type of image data obtained therein and image data is then segmented based on its respective type. As the block selection program processes the document page, a hierarchical tree structure is created as shown in FIG. 2.

As shown in FIG. 2, hierarchical tree structure 200 contains a plurality of nodes which represent segmented blocks of image data. Each node of the tree contains feature data which defines the feature of each block of image data in the processed document page. For example, the feature data may include block location data, size data, attribute data (image type, such as text, picture, table, etc.), sub-attribute data, and child node and parent node pointers. In the present invention, child or "descendent" nodes represent image data which exist entirely within a larger block of image data. Child nodes are depicted in the hierarchical tree structure as a node branching from a parent node, such as the nodes at the same level as node 211, which branch from parent or root node 201. In addition to the feature data described above, a node which represents a text block may also contain feature data defining the block's reading orientation and reading order.

Once a hierarchical tree structure, such as hierarchical tree structure 200, has been created, it is stored in memory. Upon receiving a request to process the image data in the document image, hierarchical tree structure 200 is retrieved from memory and image data which has been blocked together is processed according to the feature data stored in its corresponding node.

In addition to using the hierarchical tree structure to process image data of a document page, the hierarchical tree structure can be used to generate and display a comprehensible format of document page 101 as shown in FIG. 3. As a result, block template 301 of the document page is generated and displayed to the user based on the feature data stored in the hierarchical tree structure shown in FIG. 2.

The block template of the document page directly reflects the structure of the hierarchical tree as well as the feature data stored in each node of the hierarchical tree structure. The feature data in the node is utilized to generate the block outline, location, and size. In addition, feature data in each node is used to identify the type of image data contained within the block and, if appropriate, reading order and reading orientation. For example, as shown in FIG. 3, block template 301 includes text blocks 302, 304, 305 and 309, each of which corresponds to nodes 202,204, 205 and 209, respectively. As shown, each text block includes feature data which designate the block as text and also define a block's reading order and reading orientation.

However, in order for the user to utilize functions of the block selection program or to access information in the resulting hierarchical tree structure, the user must be familiar with the low level process steps of the block selection program as well as how data is stored in the resulting hierarchical tree structure. That is, application developers, in order to interface with the block selection program, must understand the low level process steps of the block selection program as well as the tree structure and node information. Consequently, if the low level implementation of the block selection process steps and resulting hierarchical tree structure are changed, all applications which have been developed to interface at a low level interaction must be changed accordingly.

There is, therefore, a need to develop an API which includes functions and data files which insulate the user from the tree and node details such that the functions and data files of API may remain the same regardless of the low level implementation of the block selection technique used.

SUMMARY OF THE INVENTION

It is an object to the present invention to provide an application programming interface (API) for page analysis to use functions of a block selection program and to access a data structure resulting therefrom.

In one aspect of the present invention, the present invention is an application programming interface for accessing page analysis functionality of a block selection program and for accessing data structures resulting therefrom. The application programming interface includes plural block selection functions which can manipulate block selection functionality that include functions to analyze a page of a document, create a hierarchical tree structure based on the page analysis, and to return a pointer which is a block ID of a root node of the hierarchical tree structure which represents the analyzed page. The application programming interface also includes plural hierarchical tree accessing functions to traverse the hierarchical tree structure and to obtain pointers to nodes within the hierarchical tree structure which contain image data attributes for corresponding blocks of image data requested by the user, and plural block functions for examining and obtaining node pointers to nodes which include a desired image data attribute.

According to another aspect of the present invention, the present invention is a method of creating an application programming interface for accessing page analysis functionality of a block selection program and for accessing a data structure resulting therefrom. The method includes storing, in memory, plural page analysis functionality which manipulate block selection functions, and plural hierarchical tree structure accessing functions. The method further includes the steps of selecting, from memory, at least one plural page analysis functionality and at least one plural hierarchical tree structure accessing functions, and combining the at least one plural page analysis functions and the at least one plural hierarchical tree structure accessing functions so as to create the application programming interface whereby the created application programming interface is capable of accessing page analysis functionality of a block selection program and is capable of accessing a data structure resulting therefrom.

This summary of the invention has been provided so that the nature of the invention may be understood quickly. A more complete understanding of the invention and its advantages may be obtained by reference to the following detailed description in connection with the appended drawings.

BRIEF DESCRIPTION OF THE DRAWINGS

FIG. 6, comprising FIGS. 6A and 6B, is an example of an API library which includes both API functions and API data files which are utilized to create a page analysis program according to the present invention.

DETAILED DESCRIPTION OF THE PREFERRED EMBODIMENT

Figure 1:
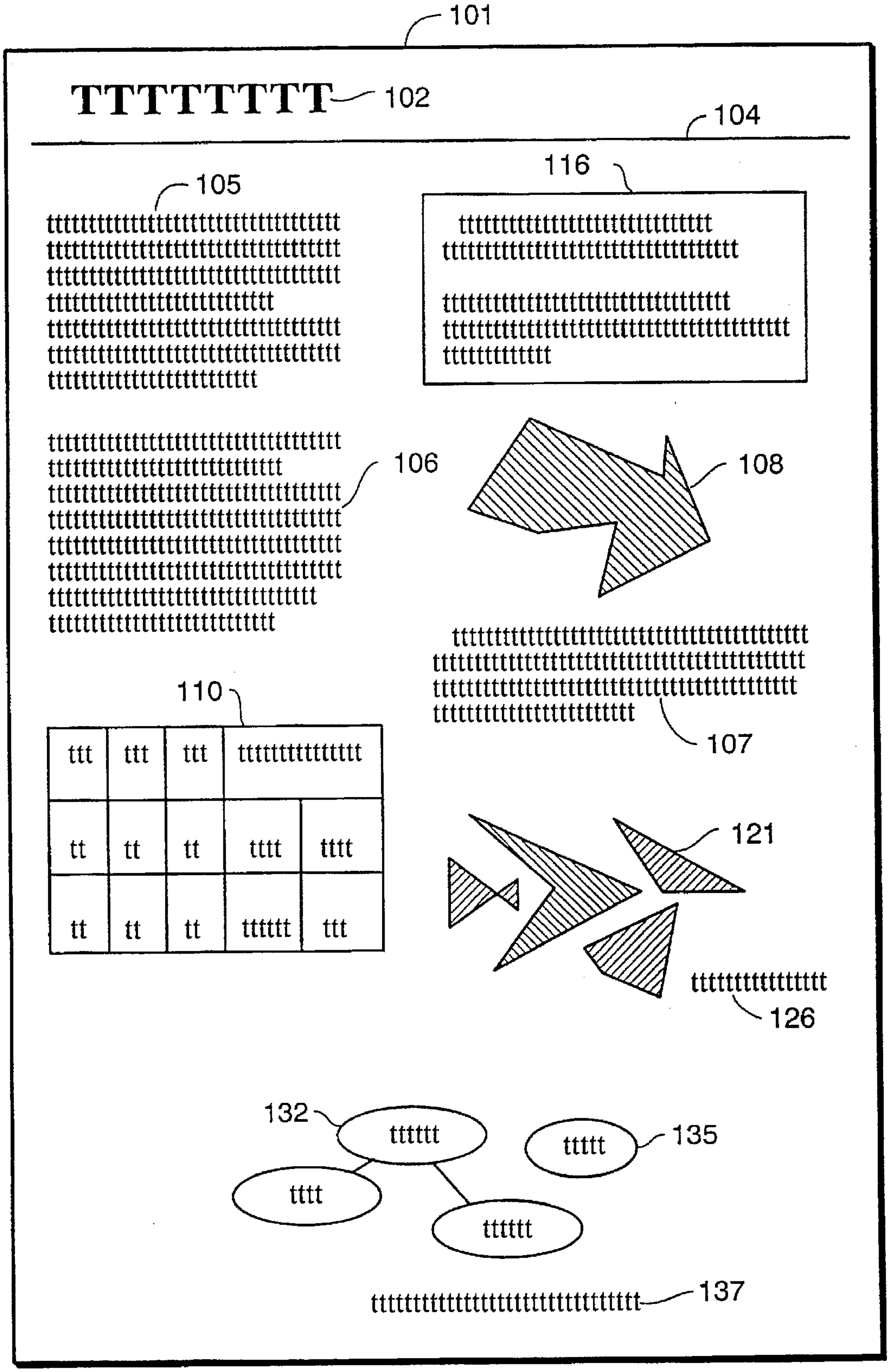
FIG. 1 is a representational view of a document page.
Figure 2:
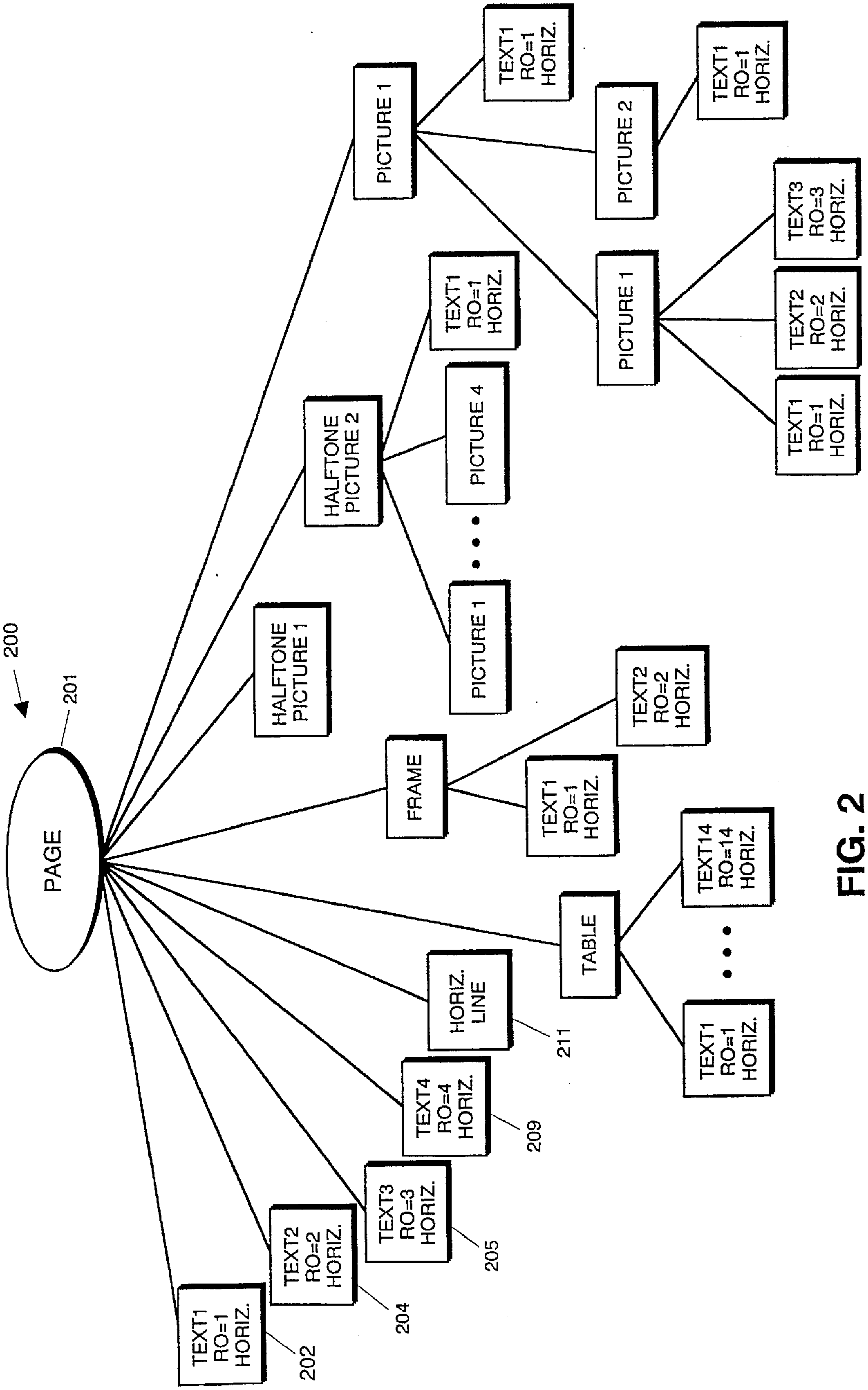
FIG. 2 is a representational view of a hierarchical tree structure resulting from a block selection operation on the document page illustrated in FIG. 1.
Figure 3:
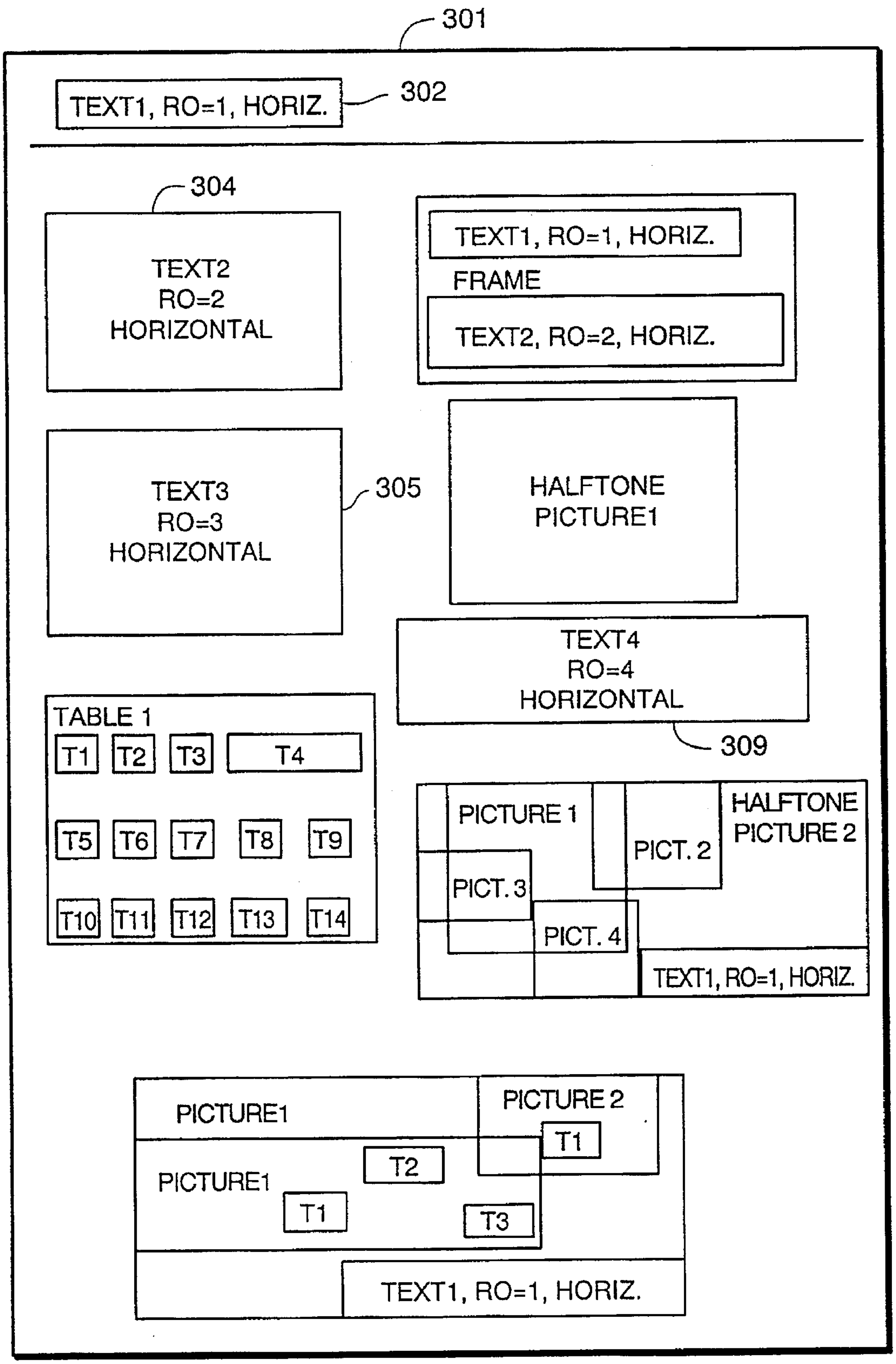
FIG. 3 is representational view of the document page which is created based on the hierarchical tree structure shown in FIG. 2.
Figure 4:
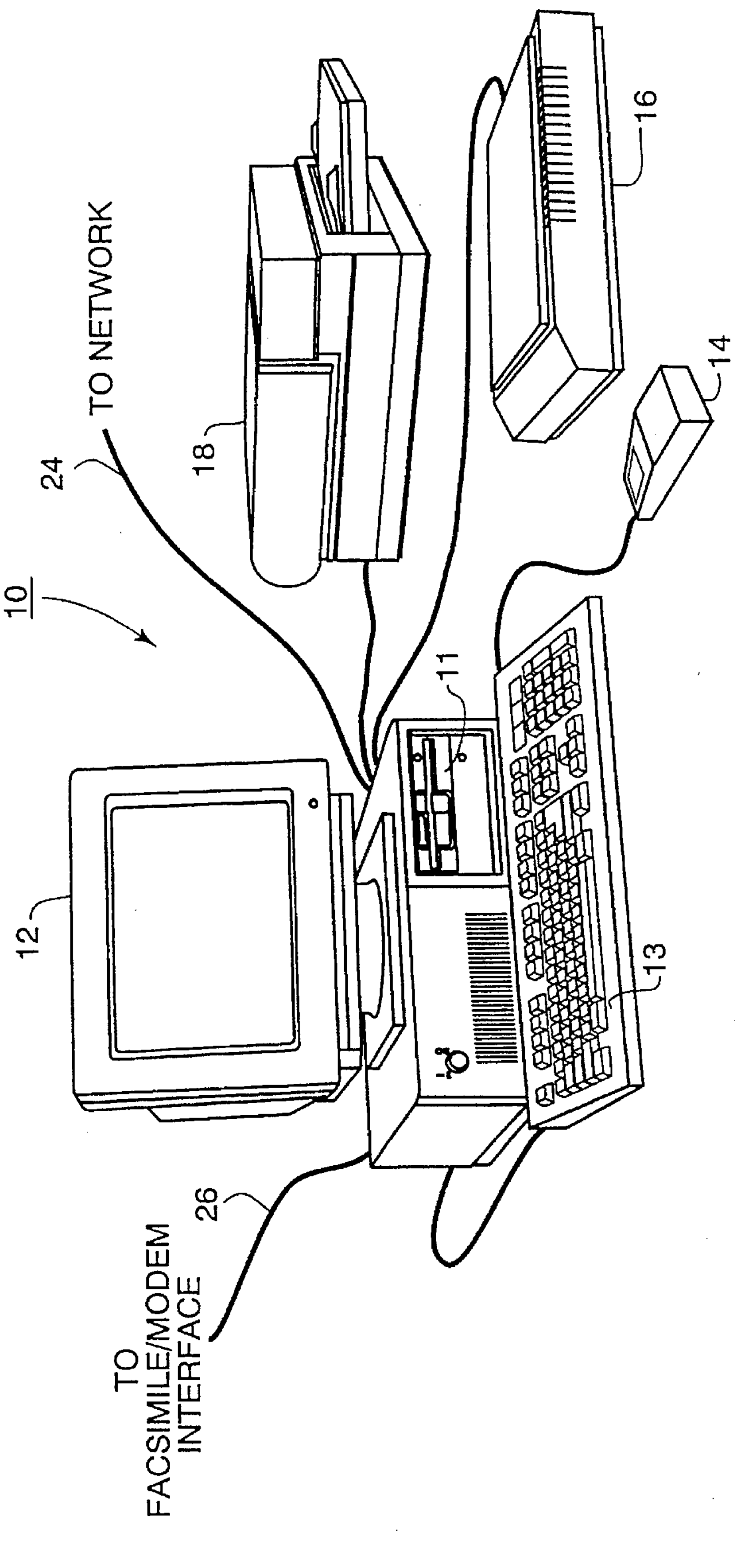
FIG. 4 is a perspective view showing the outward appearance of an apparatus according to the present invention.

FIG. 4 is a view showing the outward appearance of a representative embodiment of the invention. Shown in FIG. 4 is computing equipment 10, such as a Macintosh or an IBM PC or PC compatible computer having a windowing environment, such as Microsoft Windows®. Provided with computing equipment 10 is display screen 12, such as a color monitor, keyboard 13 for entering user commands, and pointing device 14, such as a mouse for pointing to and for manipulating objects displayed on screen 12.

Computing equipment 10 includes a mass storage device such as computer disk 11 for storing data files which include document image files, in either compressed or uncompressed format, and for storing application program files which can include at least one block selection program and an application programming interface library which includes both functions and data files. Also stored in disk 11 are various hierarchical tree structure data for each document page which has been subjected to a block selection program, and various claimant page analysis programs for variously manipulating block selection functionality and for accessing data within the hierarchical tree structure.

Document image data is input by scanner 16 which scans documents or other images and provides bitmap image of those documents of computing equipment 10. The document image data may also be input into computing equipment 10 from a variety of other sources such as network interface 24 or other external devices via facsimile/modem interface 26. Printer 18 is provided for outputting process document images.

It should be understood that, although a programmable general purpose computer arrangement is shown in FIG. 4, a dedicated or stand alone computer or other type of data processing equipment can be used to practice the present invention.

Figure 5:
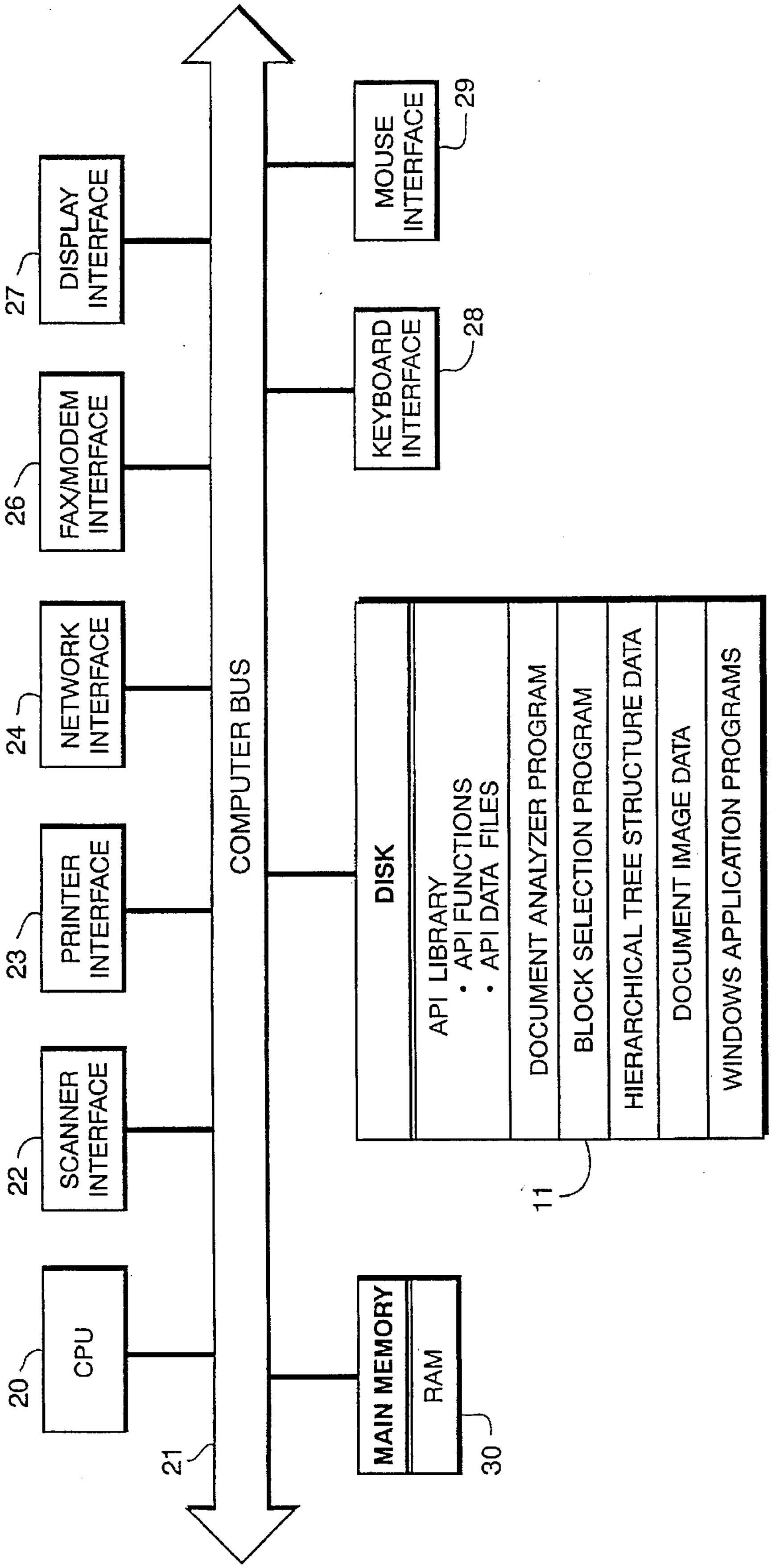
FIG. 5 is a block diagram of the FIG. 1 apparatus.

FIG. 5 is a detailed block diagram showing the internal construction of computing equipment 10. As shown in FIG. 5, computing equipment 10 includes a central processing unit (CPU) 20 interfaced with computer bus 21. Also interfaced with computer bus 21 is scanner interface 22, printer for interface 23, network interface 24, fax/modem interface 26, display interface 27, keyboard interface 28, mouse interface 29, main memory 30, and disk 11.

Main memory 30 interfaces with computer bus 21 so as to provide random access memory storage for use by CPU 20 while executing stored program instructions such as the page analyzer API or various process steps of the block selection program. More specifically, CPU 20 loads those programs from disk 11 into main memory 30 and executes those stored programs out of main memory 30.

In accordance with a user's instructions, stored application programs provide for image processing and manipulating of data. For example, a desktop processing program, such as Wordperfect® for Windows, may be activated by an operator to create, manipulate, and view documents before and after block selection has been applied. Likewise, a page analysis program may be executed to run a block selection operation to analyze various types of image data in an input document page and to display the results of the page analysis to an operator via a windowing environment.

Figure 6B:
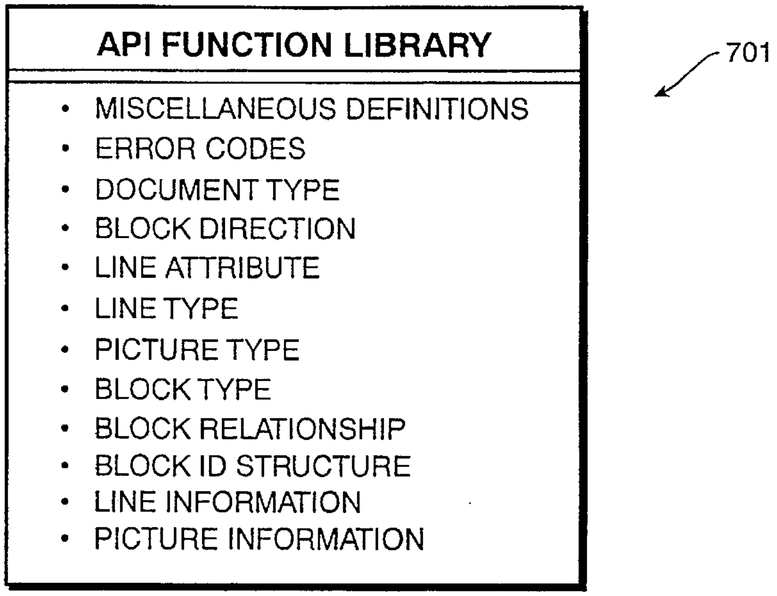

FIGS. 6A and 6B illustrate an API function library and an API data file, respectively, which are used to create a page analysis program according to the present invention.

To create a program for page analysis, the contents of the API library are retrieved from disk 11. In order to get the desired resulting program, the page analysis program is created by combining both functions and data files which are in the API library. For example, as shown in FIG. 6A, API function library 601 contains functions to manipulate processes of a block selection program and contains functions to access the data structures resulting therefrom. The API functions listed in API function library 601 are merely examples of some of the page analysis functions which can be utilized with the present invention. In this regard, other functions which could be used with the present invention are set forth in the appendix attached hereto.

As shown in FIG. 6A, API function library 601 contains page analysis functions 602, node relationship functions 609, text block functions 614, table block functions 618, line functions 623 and picture functions 625. A page analysis program could use some or all of these functions in order to perform a desired task. Each of these functions will be discussed in greater detail below.

In the present invention, page analysis functions 602 are utilized to manipulate various block selection process steps. Generally, prior to running page analysis, the page analysis program executes InitializePageAnalysis function 603 which initializes internal variables and allocates internal memory necessary for the block selection operations called by AnalyzePage function 604 to operate. Once the memory has been allocated and variables initialized, the page analysis program executes AnalyzePage function 604 which executes a page analysis operation on a stored input page of a document. The results of AnalyzePage function 604 are stored in memory as a hierarchical tree structure. At the completion of the AnalyzePage function 604, the hierarchical tree structure is completed and a root block ID is returned. If additional pages are to be analyzed, FreePageData is executed to clear memory space which was utilized in processing the previous page.

After page analysis is completed, the program executes EndPageAnalysis function 605 to free memory allocated by the InitializePageAnalysis function 603 and to exit the page analysis application.

Page analysis function 602 also includes BlockType function 606 which, when executed, returns an attribute of a specified block, such as picture, text, and non-text. PageSkew function 607, when executed, returns a skew angle of an entire page in tenths of a degree, wherein a 0 value indicates no page skew while, for example, a return value of 11 and 22 will represent a skew degree of 1.1 and 2.2, respectively.

Once the page has been analyzed and the hierarchical tree structure has been created, utilizing various functions in the API library, the user can interrogate the hierarchical tree structure in order to determine node relationships between nodes in the tree. That is, by utilizing the NodeRelationship functions 609, the user can interrogate a node in the tree to determine its relationship to another node in the tree. Thus, for example, GetAllChildren function 610 will return block IDs of all nodes of a specified type of image data having a specified parent or root node. Utilizing GetNumberOfChildren function 612, the program will return the number of children nodes of a specified node. Similarly, utilizing the GetParent function 613, the program will return a block ID of a parent node of a specified child node.

Other functions in API function library 601 permit the user to interrogate each of the nodes more closely. For example, utilizing various features of text block functions 614, a user can obtain a first text-line, a last text-line, or the next text-line of a text block. Utilizing GetFirstTextLine function 614, the program will return a pointer which is a block ID of a first text-line in a specified text node. Likewise, utilizing the GetLastTextLine function 615, and the GetNextTextLine function 617, the program will return a pointer which is a block ID or the last text-line and the next text-line, respectively, in a text block. If the user wishes to interrogate table nodes in the hierarchical tree, the user can examine data in each table node by utilizing table block function 618 which consists of GetFirstTableCell 619, GetLastTableCell 620, GetNextTableCell 621, and GetNumberOfCellsInTable function 622.

Other API functions such as line function 623 and picture function 625 permit the user to examine information in line nodes and picture nodes, respectively, in the hierarchical tree structure.

FIG. 6B illustrates an API data file which comprises parameters and definitions. The parameters and definitions contained in API data file 701 are utilized by associated API functions, defined in API function library 601. The API functions utilize their associated data files to access data in the hierarchical tree and to translate the accessed data into a user-friendly format. The parameters and definitions listed in the API data file 701 are merely examples of some of the definitions and parameters which can be utilized with the present invention. In this regard, other definitions and parameters which could be used with the present invention are set forth in the appendix attached hereto.

In the present invention, API data file 701 includes error codes 703 which are used by InitializePageAnalysis function 603, and AnalyzePage function 605 to return an error code in the case the page analysis cannot be performed due to the occurrence of a predefined event. For example, an error code may be output in the case the amount of memory required to perform a block selection operation is not sufficient or the skew of a page is too great to perform an accurate page analysis operation.

Block relationship-type definitions 704 are used by node relationship function 609 to return information regarding a relationship between specified nodes, such as parent, child, and no relation, etc. Line-type definitions 705 are accessed when returning information in response to line functions 623; and picture-type definitions 706 are accessed when returning information in response to picture functions 625.

Utilizing the API data file and API functions stored in API libraries 601 and 701, the user can create a page analysis program by combining at least one of the plural page analysis functions and at least one data file to create a desired API. For example, the user may select AnalyzePage function 603 in order to execute the block selection program stored on disk 11. Depending on the user's goal, the user may also select at least one of the plurality of relationship functions or one of the plurality of specific node feature functions, such as text block function, table block function, line block function, or picture block functions. Each of the selected functions will be coupled with its corresponding data file from API data file 701.

Upon combining desired functions and their associated data files, a page analysis program is formed. The newly created program can then be used to perform its predefined task. For example, the user's goal may be to perform optical character recognition (OCR) operation on all text blocks existing in the document page. Accordingly, the program could consist of AnalyzePage function 603 and GetAllChildrenBlock function 604 in order to return all children blocks of the root node which have a text attribute. By utilizing at least these two functions, the user can get all children blocks of the root node which are text and then submit the results of that program to an OCR processing program.

Figure 7:
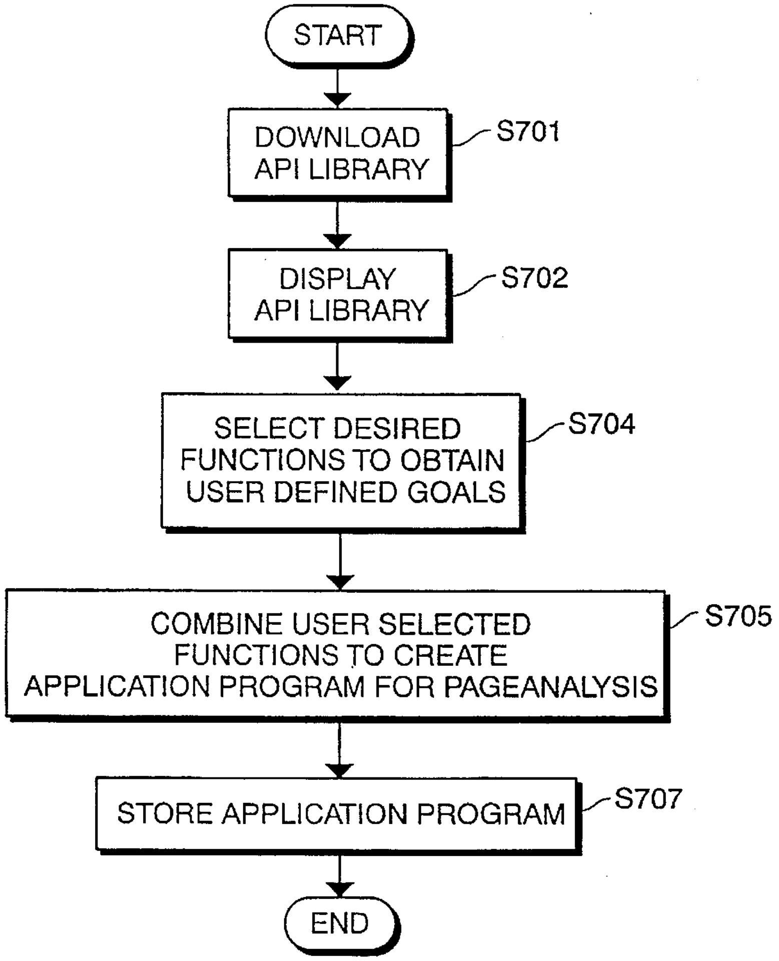
FIG. 7 is a flow diagram describing a method for creating an application program utilizing the API of the present invention.

FIG. 7 is a detailed flow diagram of a method by which a page analysis program can be created utilizing the API library of the present invention.

In step S701, the API library, such as the one illustrated in FIGS. 6A and 6B, is downloaded from disk 11 into a random access memory (not shown). The API library loaded in random access memory is displayed to the user in step S702. Depending on the user's goal, one or more functions and corresponding data structures are selected and combined from the API library to obtain a program which produces a desired result.

Thus, in step S704, the user selects one or more functions and corresponding data files from the API library. In step S705, the functions and data files are compiled to form a desired application program.

In step S707, the newly created program is stored on disk 11 and can be executed from disk 11 to perform its desired function either directly by the user or by another program.

APPENDIX

Overview

The Page Analyzer SDK provides a set of functions for analyzing the logical structure of a page image in a systematic and uniform way. Abstractly, a page consists of smaller components of various types such as text, title, table, picture, frame, line or just simply noise. Some of these components can also contain smaller components. The SDK is designed and implemented to ensure usability and flexibility.

The Page Analyzer SDK accepts an image of a page, decomposes it into blocks (also called "zones"), classifies the blocks according to types, determines their reading order, and creates a tree structure in memory representing the page. The API functions allow the user to traverse the tree and utilize the information in it, but they do not allow any direct modification of the tree. Several API functions require the caller to take responsibility for memory allocation and deallocation.

Block Selection Technology

Block Objects

Block selection analyzes the document and categorizes all important areas of the document. The following image block are recognized:

- TEXT: No strict rule about how many text paragraphs are contained. The reading direction of text area could be vertical, horizontal or unknown. Text could be regular text, title, text inside the table, caption or the text associated with some picture.

- PICTURE:
  - *Line drawing picture:* line art style picture. The text enclosed can also be recognized.
  - *Halftone picture:* the original image could be gray-scale picture, halftone picture, continuous tone picture, or photo.
- TABLE: Any typical table with visible lines dividing the table into smaller cells. The algorithm works better for clearly scanned table in which all separator lines are visible and complete. For tables with incomplete lines after scanning, the error probability may be higher.
- LINE: A solid line which thickness might be within the majority text thickness of the same page. Dotted line and slanted line can also be recognized. The edge of the line should be smooth enough after the scanning in order to get better recognition. There are 3 types of lines:
  - *Horizontal line:* A horizontal solid/dotted line.
  - *Vertical line:* A vertical solid/dotted line.
  - *Joint line:* Exact horizontal and vertical lines intersected at a 90 degree angle. Sometimes a joint line behaves as a separator which may separate different areas; therefore, we try to recognize the joint line.
- FRAME: A frame is typically surrounded by a rectangle. The frame thickness and the density of the frame interior may affect the recognition.
- REGION: A special type of picture entity which may contain separate image components as well as captions and/or text associated with the picture.

API Definitions & Structures

This section describes all functions and data structures used in the *Page Analysis* SDK.

The user should include only the file pa.h which includes other related include files.

*pa.h File*

```
        This is an include file describing structures and
functions for PA SDK.

#ifndef pa_h
#define pa_h

#include "rbm.h"
```

<u>Miscellaneous Definitions</u>

```
#ifndef TRUE
#define TRUE                    1
#endif

#ifndef FALSE
#define FALSE                   0
#endif

#ifndef NULL
#define NULL                    0
#endif

#ifndef BOOL
#define BOOL int
#endif
```

PA API Error Codes

```
typedef int PA_ERR;

#define PA_SUCCESS                0   /* No error */
#define PA_ERR_INTERNAL           1   /* Internal error of SDK
*/
#define PA_ERR_OUT_OF_MEMORY      2   /* System is out of
memory */
#define PA_ERR_NO_INIT_CALL       3   /* No initialization call
yet */
#define PA_ERR_INVALID_BLOCK_ID   4   /* Bad block id */
#define PA_ERR_EXCEED_MAX_PAGE    5   /* Exceed the maximum
number of */
                                                /*   pages
during one PA */
                                                /*   session,
which is 10 */

#define PA_ERR_BLOCK_NOT_LINE    21   /* Block is not a line
block */
#define PA_ERR_BLOCK_NOT_PICT    22   /* Block is not a picture
block */
```

Document type

Depending on the layout style or the language, a document can be a regular, left-to-right, English type of document, or an up-and-down, Japanese or Chinese type, or a mixture of both.

```
typedef enum {
    PA_DOC_HORIZONTAL,      /* left-to-right document, English
type */
    PA_DOC_VERTICAL,        /* up-and-down document, Japanese
type */
    PA_DOC_MIXED            /* both left-to-right and up-and-
down */
} PA_DOC_TYPE;
```

Block direction type

The Page Analyzer identifies the boundaries of blocks. It also detects the orientation of each block.

```
typedef enum {
    PA_DIR_UNKNOWN,          /* unknown */
    PA_DIR_HORIZONTAL,       /* horizontal: left-right or right-
left */
    PA_DIR_VERTICAL,         /* vertical:   up-down or bottom-up
*/
} PA_DIR_TYPE;
```

<u>Line attribute</u>

```
typedef enum {
    PA_LINE_SOLID,           /* solid line */
    PA_LINE_DOTTED           /* dotted line */
} PA_LINE_ATTR;
```

<u>Line type</u>

```
typedef enum {
    PA_LINE_HORIZONTAL,      /* horizontal line */
    PA_LINE_VERTICAL,        /* vertical line */
    PA_LINE_JOINT            /* joint line consisting multiple
line    */
                             /*   segments (vertical and/or
horizontal)*/
} PA_LINE_TYPE;
```

<u>Line Information</u>

```
typedef struct LineInfoStruct {
    PA_LINE_TYPE   LineType;
    PA_LINE_ATTR   LineAttr;
    int            LineSlantAngle;
} PA_LINE_INFO;
```

<u>Picture type</u>

Two types of pictures are identified: PA_PICT_HALFTONE (grey scaled) and PA_PICT_LINEART (composed of straight and curve lines). A picture can be a stand-alone, independent picture without children blocks, or consists of smaller images and related text blocks such as captions. (Please see the function PA_GetNumberOfChildrenBlocks discussed in API function section.)

```
typedef enum {
```

```
    PA_PICT_UNKNOWN,        /* unknown picture type -- noise,
etc. */
    PA_PICT_HALFTONE,       /* a halftone picture */
    PA_PICT_LINEART,        /* a picture containing smaller
components*/
} PA_PICT_TYPE;
```

Picture Information

```
typedef struct PictInfoStruct {
    PA_PICT_TYPE   PictType;
} PA_PICT_INFO;
```

Basic block type

The Page Analyzer classifies blocks into the following categories.

```
#define PA_BLOCK_UNKNOWN     0x0000   /* unknown type */
#define PA_BLOCK_TEXT        0x0001   /* regular text block */
#define PA_BLOCK_TITLE       0x0002   /* title block */
#define PA_BLOCK_CAPTION     0x0004   /* caption block */
#define PA_BLOCK_TEXTLINE    0x0008   /* text line */
#define PA_BLOCK_PICT        0x0010   /* picture block */
#define PA_BLOCK_LINE        0x0020   /* line drawing block */
#define PA_BLOCK_FRAME       0x0040   /* frame block */
#define PA_BLOCK_TABLE       0x0080   /* table block */
#define PA_BLOCK_REGION      0x0100   /* region consisting of
*/
                                      /*   smaller objects */
#define PA_BLOCK_ALL_TEXT    (PA_BLOCK_TEXT     |   \
                              (PA_BLOCK_TITLE   |   \
                              (PA_BLOCK_CAPTION)
#define PA_BLOCK_NON_TEXT    (PA_BLOCK_ALL_TEXT |   \
                              (PA_BLOCK_TEXTLINE)
#define PA_BLOCK_ANYTYPE     (PA_BLOCK_TEXT     |   \
                              PA_BLOCK_TITLE    |   \
                              PA_BLOCK_CAPTION  |   \
                              PA_BLOCK_TEXTLINE |   \
                              PA_BLOCK_PICT     |   \
                              PA_BLOCK_LINE     |   \
                              PA_BLOCK_FRAME    |   \
                              PA_BLOCK_TABLE    |   \
                              PA_BLOCK_REGION)
```

```
                                   /* any one of the basic block
types */

typedef unsigned int PA_BLOCK_TYPE;
```

Block relationship type

The Page Analyzer determines the relationships among blocks in the tree.

```
typedef enum {
    PA_REL_SELF,                /* self */
    PA_REL_ANCESTOR,            /* ancestor */
    PA_REL_DESCENDANT,          /* descendant */
    PA_REL_PARENT,              /* parent */
    PA_REL_CHILD,               /* child */
    PA_REL_OLDER_SIBLING,       /* older sibling */
    PA_REL_YOUNGER_SIBLING,     /* younger sibling */
    PA_REL_NO_RELATION          /* no relation */
} PA_REL_TYPE;
```

Block ID structure

The PA_BLOCK_ID structure is a handle to the block.

```
typedef struct tagBlockID {
    int bsapitype;
    void *bid;
} PA_BLOCK_ID;

/*
** A NULL block id.
*/
static PA_BLOCK_ID PA_NULL_BLOCK_ID =
{0, NULL};
```

General Functions

```
PA_ERR          PA_AnalyzePage ();
PA_ERR          PA_EndPageAnalyzer ();
PA_ERR          PA_FreePageData ();
PA_ERR          PA_InitPageAnalyzer ();
```

Generic Block Functions

```
BOOL            PA_BlockIdIsNull ();
PA_ERR          PA_ExtractBlockImageBit1D ();
PA_ERR          PA_ExtractBlockImageByte2D ();
PA_ERR          PA_GetBlockBoundary ();
PA_BLOCK_TYPE   PA_GetBlockType ();
int             PA_GetPageSkew ();
BOOL            PA_SameBlocks ();
```

Block Hierarchy-related Functions

```
BOOL            PA_BlockIsComposite ();
PA_ERR          PA_GetAllChildenBlocks ();
PA_ERR          PA_GetAllDescendantBlocks ();
PA_BLOCK_ID     PA_GetAncestorBlock ();
PA_REL_TYPE     PA_GetBlockRelation ();
int             PA_GetDepthOfBlock ();
PA_BLOCK_ID     PA_GetFirstChildBlock ();
PA_BLOCK_ID     PA_GetLastChildBlock ();
PA_BLOCK_ID     PA_GetNextChildBlock ();
int             PA_GetNumberOfChildrenBlocks ();
int             PA_GetNumberOfDescendantBlocks ();
PA_BLOCK_ID     PA_GetParentBlock ();
PA_BLOCK_ID     PA_GetPreviousChildBlock ();
```

Line Functions

```
PA_ERR          PA_GetLineInfo ();
```

Picture Functions

```
PA_ERR          PA_GetPictureInfo ();
```

Text Block Functions

Text block is a special case of blocks. Text block manipulation can be achieved by calling generic block functions directly. Text block functions are implemented as macros calling generic block functions.

```
#define
PA_ExtractTextLineImageByte2D(BlockId,SourceImageInfoPtr,
DestImagePtr2)\
```

```
PA_ExtractBlockImageByte2D(BlockId,SourceImageInfoPtr,DestImage
Ptr2)

#define PA_GetFirstTextLine(BlockId) \
          PA_GetFirstChildBlock (BlockId, PA_BLOCK_TEXTLINE)

#define PA_GetLastTextLine(BlockId) \
          PA_GetLastChildBlock (BlockId, PA_BLOCK_TEXTLINE)

#define PA_GetNextTextLine(BlockId) \
          PA_GetNextChildBlock (BlockId, PA_BLOCK_TEXTLINE)

#define PA_GetNumberOfTextLinesInBlock(BlockId) \
          PA_GetNumberOfChildrenBlocks (BlockId,
PA_BLOCK_TEXTLINE)

#define PA_GetPreviousTextLine(BlockId) \
          PA_GetPreviousChildBlock (BlockId,
PA_BLOCK_TEXTLINE)

#define PA_GetTextLineBoundary(BlockId,BoundaryPtr) \
          PA_GetBlockBoundary (BlockId,BoundaryPtr)
```

Table Block Functions

Table block is a special case of blocks. Table block manipulation can be achieved by calling generic block functions directly. Table block functions, except PA_GetIthTableCell, are implemented as macros calling generic block functions.

```
#define PA_GetFirstTableCell(BlockId,BlockType) \
          PA_GetFirstChildBlock (BlockId, BlockType)

PA_BLOCK_ID PA_GetIthTableCell ();

#define PA_GetLastTableCell(BlockId,BlockType) \
          PA_GetLastChildBlock (BlockId, BlockType)

#define PA_GetNextTableCell(BlockId,BlockType) \
          PA_GetNextChildBlock (BlockId, BlockType)

#define PA_GetNumberOfCellsInTable(BlockId,BlockType) \
          PA_GetNumberOfChildrenBlocks (BlockId, BlockType)
```

```
#define PA_GetPreviousTableCell(BlockId,BlockType) \
          PA_GetPreviousChildBlock (BlockId, BlockType)


#endif   /* end of pa_h */
```

*rbm.h File*

This is an include file describing structures and functions for dealing with raw bitmap. They are used by Page Analysis APIs, but they are independent of those PA APIs and are thus suitable for use in other contexts. Please refer to the RBM API document for details.

```
#ifndef rbm_h
#define rbm_h

typedef struct tagRECTANGLE
{
    int left;
    int top;
    int right;
    int bottom;
} RBM_RECTANGLE;

#define POINTINRECTANGLE(x,y,p) \
          ((x)>=(p)->left && (x)<=(p)->right &&   \
           (y)>=(p)->top && (y)<=(p)->bottom)

/*
          The RBM_RAW_BITMAP structure keeps the information
regarding the image to be analyzed.  The member pImage points
to an uncompressed image which is stored as a top-to-bottom
concatenation of the scanlines of the image.  Each scanline is
stored left-to-right, 1 bit-per-pixel.

typedef struct tagRAWBITMAP
{
    unsigned char *pImage;   /* -> the image, 1 bit-per-pixel
 */
```

```
   int   nWidthInBytes;     /* width of image in bytes
*/
   int   nWidth;            /* width of image in pixels
*/
   int   nHeight;           /* height of image in pixels
*/
   int   nDPI;              /* density of image in dots-per-
inch */
} RBM_RAW_BITMAP;

#ifdef PROTOTYPE

void            RBM_InvertRawBitmap (RBM_RAW_BITMAP
*pRawBitmap);
RBM_RAW_BITMAP *RBM_CreateScaledRawBitmap (RBM_RAW_BITMAP
*pRawBitmap,
                                          int nScale);
RBM_RAW_BITMAP *RBM_AllocRawBitmap (int nDPI, int
nWidthInBytes,
                                    int nWidthInPixels,
                                    int nHeightInPixels);
void            RBM_FreeRawBitmap (RBM_RAW_BITMAP *pRawBitmap);

#else

void            RBM_InvertRawBitmap ();
RBM_RAW_BITMAP *RBM_CreateScaledRawBitmap ();
RBM_RAW_BITMAP *RBM_AllocRawBitmap ();
void            RBM_FreeRawBitmap ();

#endif

#ifdef PROTOTYPE

int             RBM_UnloadTiffPage (RBM_RAW_BITMAP
*pRawBitmap);
RBM_RAW_BITMAP *RBM_LoadTiffPage (char *pszFileName, int
nPageNumber);

#else

int             RBM_UnloadTiffPage ();
RBM_RAW_BITMAP *RBM_LoadTiffPage ();

#endif
```

```
#endif   /* end of rbm_h */
```

API Functions

The API functions are grouped into logical categories and described individually in this section. In each category, functions are listed in alphabetical order. Each function description also includes the information about the input parameters and function return value. For the meaning of the returned error, please refer to the defines in pa.h file in the previous section.

*General Functions*

The following are general functions.

PA_AnalyzePage

```
        PA_AnalyzePage runs page analysis on a given area of a
given page image.  The results are stored in memory as a
hierarchy (tree) of blocks.  The caller should call
PA_InitPageAnalyzer before calling this function.  Currently,
up to ten pages can be processed simultaneously.  The caller
has to call this function once for each page and save the root
block id for each page.  The caller does not have to call
PA_FreePageData to free a page before processing another page.
However, it is important that the caller calls PA_FreePageData
passing the saved root block id to free resources used by a
page once it finishes processing that page.

   Parameters:
      ImageInfoPtr      (Input)
                 Points to a structure containing data such as
pointer
                to image and image size information.
      DocType           (Input)
```

Type of document. Please refer to defines of PA_DOC_TYPE.

AreaPtr (Input)

Points to a structure describing the boundary of an area to be analyzed. If this pointer is NULL, the whole image will be analyzed.

BlockIdPtr (Output)

(Address of) The root block of the block hierarchy of the page.

Function returned values:

PA_SUCCESS
PA_ERR_NO_INIT_CALL
PA_ERR_EXCEED_MAX_PAGE

Function prototype:

```
PA_ERR
PA_AnalyzePage (ImageInfoPtr, DocType, AreaPtr,
BlockIdPtr)
    RBM_RAW_BITMAP   *ImageInfoPtr;
    PA_DOC_TYPE       DocType;
    RBM_RECTANGLE    *AreaPtr;
    PA_BLOCK_ID      *BlockIdPtr;
```

PA_EndPageAnalyzer

PA_EndPageAnalyzer frees memory allocated by the PA_InitPageAnalyzer function. This function does nothing if PA_InitPageAnalyzer was not called. This function should be called before exiting the application.

Parameters:

None

Function returned values:

PA_SUCCESS

Function prototype:

```
PA_ERR
PA_EndPageAnalyzer ()
```

PA_FreePageData

PA_FreePageData frees the page analysis block hierarchy created by PA_AnalyzePage. The caller does not have to call this function before calling PA_AnalyzePage to analyze another page. Currently, up to ten pages can be processed simultaneously. However, it is important that the caller calls PA_FreePageData passing the root block id returned by PA_AnalyzePage to free resources used by a page once it finishes processing that page.

```
Parameters:
   BlockId          (Input)
           The root block of the block hierarchy returned by
         PA_AnalyzePage function.

Function returned values:
   PA_SUCCESS  (0)
   >0       If any error occurred.

Function prototype:

   PA_ERR
   PA_FreePageData (BlockId)
      PA_BLOCK_ID       BlockId;
```

PA_InitPageAnalyzer

PA_InitPageAnalyzer initializes internal variables and allocates internal memory necessary for the Page Analyzer. This function should be called once for the entire application. Extra calls to this function are ignored. PA_EndPageAnalyzer should be called to free memory allocated by this function.

```
Parameters:
   None

Function returned values:
   PA_SUCCESS
```

PA_ERR_OUT_OF_MEMORY

Function prototype:

```
PA_ERR
PA_InitPageAnalyzer ()
```

*Generic Block Functions*

The following functions are not specific to any block type.

PA_BlockIdIsNull

PA_BlockIdIsNull checks if a block id is the PA_NULL_BLOCK_ID.

Parameters:

```
BlockId          (Input)
        The block to be checked.
```

Function returned values:

```
TRUE     Block is PA_NULL_BLOCK_ID.
FALSE    Block is not PA_NULL_BLOCK_ID.
```

Function prototype:

```
BOOL
PA_BlockIdIsNull (BlockId)
   PA_BLOCK_ID       BlockId;
```

PA_ExtractBlockImageBit1D

PA_ExtractBlockImageBit1D extracts the bitmap image of a block into a 1-D bit-per-pixel array. The user is responsible for allocating and freeing the required space. The minimum required size of the destination bitmap can be determined by calling the PA_GetBlockBoundary function.

Parameters:
BlockId (Input)
The block to be extracted.
SourceImageInfoPtr (Input)
Points to a structure containing data such as a pointer to the image and other image size information.
DestImageInfoPtr (Output)
Points to a destination structure containing data such as a pointer to the image and other image size information.

Function returned values:
PA_SUCCESS (0)
> 0 If any error occurred.

Function prototype:

```
PA_ERR
PA_ExtractBlockImageBit1D (BlockId,
                              SourceImageInfoPtr,
DestImageInfoPtr)
    PA_BLOCK_ID      BlockId;
    RBM_RAW_BITMAP   *SourceImageInfoPtr;
    RBM_RAW_BITMAP   *DestImageInfoPtr;
```

PA_ExtractBlockImageByte2D

PA_ExtractBlockImageByte2D extracts the bitmap image of a block into a 2-D byte-per-pixel array. A 2-D byte-per-pixel array is defined as an array of pointers. Each pointer points to an array of unsigned char which representing a single row of the image.

The user is responsible for allocating and freeing the required space. The minimum required size of the destination bitmap can be determined by calling the PA_GetBlockBoundary function.

Parameters:
BlockId (Input)
The block to be extracted.
SourceImageInfoPtr (Input)

Points to a structure containing data such as a pointer to the image and other image size information.

```
DestImagePtr2    (Output)
        2-D array for the extracted image.

Function returned values:
   PA_SUCCESS  (0)
   > 0      If any error occurred.

Function prototype:

   PA_ERR
   PA_ExtractBlockImageByte2D (BlockId,
                               SourceImageInfoPtr,
DestImagePtr2)
      PA_BLOCK_ID       BlockId;
      RBM_RAW_BITMAP    *SourceImageInfoPtr;
      unsigned char     **DestImagePtr2;
```

PA_GetBlockBoundary

PA_GetBlockBoundary returns the boundary of a block.

```
Parameters:
   BlockId          (Input)
          The current block.
   BoundaryPtr      (Output)
          (Address of) The boundary structure.

Function returned values:
   PA_SUCCESS  (0)
   >0      If any error occurred.

Function prototype:

   PA_ERR
   PA_GetBlockBoundary (BlockId, BoundaryPtr)
      PA_BLOCK_ID       BlockId;
      RBM_RECTANGLE     *BoundaryPtr;
```

PA_GetBlockType

PA_GetBlockType returns the block type of a block.

Parameters:
BlockId (Input)
The current block.

Function returned values:
Block type. Please refer to defines PA_BLOCK_...

Function prototype:

```
PA_BLOCK_TYPE
PA_GetBlockType (BlockId)
    PA_BLOCK_ID        BlockId;
```

PA_GetPageSkew

PA_GetPageSkew returns the skew angle of the entire page in tenths of a degree. A zero value indicates that the page is not skew, while, for example, the return values of 11 and 22 show the skew degree of 1.1 and 2.2, respectively.

Parameters:
BlockId (Input)
The root block of the block hierarchy returned by PA_AnalyzePage function.

Function returned values:
>=0 skew angle (in tenths of a degree) of the page
-1 if BlockId is not the root block returned by PA_AnalyzePage.

Function prototype:

```
int
PA_GetPageSkew (BlockId)
    PA_BLOCK_ID        BlockId;
```

PA_SameBlocks

PA_SameBlocks checks if two blocks are the same.

Parameters:
```
BlockId1        (Input)
        The first  block to be checked.
BlockId2        (Input)
        The second block to be checked.
```

Function returned values:
```
TRUE    Blocks are the same.
FALSE   Blocks are not the same.
```

Function prototype:

```
BOOL
PA_SameBlocks (BlockId1, BlockId2)
   PA_BLOCK_ID        BlockId1;
   PA_BLOCK_ID        BlockId2;
```

*Hierarchy-related Functions*

PA_BlockIsComposite

PA_BlockIsComposite checks if a block contains one or more children blocks.

Parameters:
```
BlockId         (Input)
        The block to be checked.
```

Function returned values:
```
TRUE    Block is a composite block.
FALSE   Block is not a composite block.
```

Function prototype:

```
BOOL
PA_BlockIsComposite (BlockId)
```

```
PA_BLOCK_ID        BlockId;
```

PA_GetAllChildrenBlocks

PA_GetAllChildrenBlocks gets all "immediate" children blocks of a specified type of a block. The caller should call PA_GetNumberOfChildrenBlocks and allocate memory for the block id array before calling this function.

```
Parameters:
   BlockId          (Input)
           The current block.
   BlockType        (Input)
           Type of block to be selected.
           Refer to defines of PA_BLOCK_... for block types.
   ChildrenBlockIdPtr  (Output)
           Pointer to an array of children block ids.

Function returned values:
   PA_SUCCESS  (0)
   >0      If any error occurred.

Function prototype:

   PA_ERR
   PA_GetAllChildrenBlocks (BlockId, BlockType,
ChildrenBlockIdPtr)
      PA_BLOCK_ID       BlockId;
      PA_BLOCK_TYPE     BlockType;
      PA_BLOCK_ID      *ChildrenBlockIdPtr;
```

PA_GetAllDescendantBlocks

PA_GetAllDescendantBlocks gets all descendant blocks of a block matching the specified type and within the specified levels.

Note that children of PA_BLOCK_TEXT blocks (e.g. PA_BLOCK_TEXTLINE blocks) are not counted. The caller should call PA_GetNumberOfDescendantBlocks and allocate memory for the block id array before calling this function.

```
Parameters:
   BlockId          (Input)
            The current block.
   BlockType        (Input)
            Type of block to be selected.
            Refer to defines of PA_BLOCK_... for block types.
   Levels           (Input)
            Number of descendant levels to be included.
   DescendantBlockIdPtr  (Output)
            Pointer to an array of descendant block ids.

Function returned values:
   PA_SUCCESS  (0)
   >0       If any error occurred.

Function prototype:

   PA_ERR
   PA_GetAllDescendantBlocks (BlockId, BlockType, Levels,
                              DescendantBlockIdPtr)
      PA_BLOCK_ID       BlockId;
      PA_BLOCK_TYPE     BlockType;
      int               Levels;
      PA_BLOCK_ID      *DescendantBlockIdPtr;
```

PA_GetAncestorBlock

PA_GetAncestorBlock returns the most deeply nested (closest) ancestor block which contains two specified blocks.

```
Parameters:
   BlockId1         (Input)
            The first  block.
   BlockId2         (Input)
            The second block.

Function returned values:
   Block id of the ancestor block.
   PA_NULL_BLOCK_ID will be returned if no such block found.
```

Function prototype:

```
PA_BLOCK_ID
PA_GetAncestorBlock (BlockId1, BlockId2)
   PA_BLOCK_ID       BlockId1;
   PA_BLOCK_ID       BlockId2;
```

PA_GetBlockRelation

PA_GetBlockRelation returns the relationship of the specified first block with respect to the second block.

Parameters:

```
BlockId1         (Input)
        The first  block.
BlockId2         (Input)
        The second block.
```

Function returned values:

Relation type. Please refer to defines of PA_REL_...

Function prototype:

```
PA_REL_TYPE
PA_GetBlockRelation (BlockId1, BlockId2)
   PA_BLOCK_ID       BlockId1;
   PA_BLOCK_ID       BlockId2;
```

PA_GetDepthOfBlock

PA_GetDepthOfBlock returns the depth of a block.

Parameters:

```
BlockId          (Input)
        The current block.
```

Function returned values:

Depth of the block.

If the page is a white empty page (i.e. root block is PA_NULL_BLOCK_ID), 0 will be returned.

Function prototype:

```
int
PA_GetDepthOfBlock (BlockId)
   PA_BLOCK_ID       BlockId;
```

PA_GetFirstChildBlock

PA_GetFirstChildBlock returns the first child block of the specified type.

Parameters:

```
BlockId          (Input)
        The current block.
BlockType        (Input)
        Type of block to be selected.
        Refer to defines of PA_BLOCK_... for block types.
        If the type is PA_BLOCK_ANYTYPE, preference is given
        to the first PA_BLOCK_TEXT child block.
```

Function returned values:

PA_BLOCK_ID of the selected child block.

PA_NULL_BLOCK_ID will be returned if no block of the specified type found.

Function prototype:

```
PA_BLOCK_ID
PA_GetFirstChildBlock (BlockId, BlockType)
   PA_BLOCK_ID       BlockId;
   PA_BLOCK_TYPE     BlockType;
```

PA_GetLastChildBlock

PA_GetLastChildBlock returns the last child block of the specified type.

```
Parameters:
   BlockId          (Input)
         The current block.
   BlockType        (Input)
         Type of block to be selected.
         Refer to defines of PA_BLOCK_... for block types.
         If the type is PA_BLOCK_ANYTYPE, preference is given
         to the last PA_BLOCK_TEXT child block.

Function returned values:
   PA_BLOCK_ID of the selected child block.
   PA_NULL_BLOCK_ID will be returned if no block of the specified type found.

Function prototype:

   PA_BLOCK_ID
   PA_GetLastChildBlock (BlockId, BlockType)
      PA_BLOCK_ID       BlockId;
      PA_BLOCK_TYPE     BlockType;
```

PA_GetNextChildBlock

PA_GetNextChildBlock returns the next child block of the specified type of the current child block. Note that the next child block is on the same level as the current child block.

```
Parameters:
   BlockId          (Input)
         The current child block.
   BlockType        (Input)
         Type of block to be selected.
         Refer to defines of PA_BLOCK_... for block types.
```

Function returned values:
PA_BLOCK_ID of the selected child block.
PA_NULL_BLOCK_ID will be returned if no block of the specified type found.

Function prototype:

```
PA_BLOCK_ID
PA_GetNextChildBlock (BlockId, BlockType)
   PA_BLOCK_ID       BlockId;
   PA_BLOCK_TYPE     BlockType;
```

PA_GetNumberOfChildrenBlocks

PA_GetNumberOfChildrenBlocks returns the number of "immediate" children blocks of the specified block type.

Parameters:
BlockId (Input)
The current block.
BlockType (Input)
Type of block to be selected.
Refer to defines of PA_BLOCK_... for block types.

Function returned values:
Number of children blocks.

Function prototype:

```
int
PA_GetNumberOfChildrenBlocks (BlockId, BlockType)
   PA_BLOCK_ID       BlockId;
   PA_BLOCK_TYPE     BlockType;
```

PA_GetNumberOfDescendantBlocks

PA_GetNumberOfDescendantBlocks returns the number of descendant blocks of the specified block type and levels of a block. Note that children of PA_BLOCK_TEXT blocks (e.g. PA_BLOCK_TEXTLINE blocks) are not counted.

```
Parameters:
   BlockId          (Input)
           The current block.
   BlockType        (Input)
           Type of block to be selected.
           Refer to defines of PA_BLOCK_... for block types.
   Levels           (Input)
           Descendant levels to be searched.

Function returned values:
   Number of descendant blocks.

Function prototype:

   int
   PA_GetNumberOfDescendantBlocks (BlockId, BlockType, Levels)
      PA_BLOCK_ID         BlockId;
      PA_BLOCK_TYPE       BlockType;
      int                 Levels;
```

PA_GetParentBlock

PA_GetParentBlock returns the parent block of a block.

```
Parameters:
   BlockId          (Input)
           The current block.

Function returned values:
   Block id of the parent block.
   PA_NULL_BLOCK_ID will be returned if the current block is the root block.

Function prototype:

   PA_BLOCK_ID
   PA_GetParentBlock (BlockId)
      PA_BLOCK_ID         BlockId;
```

PA_GetPreviousChildBlock

PA_GetPreviousChildBlock returns the previous child block of a specified type of the current child block. Note that the previous child block is on the same level as the current child block.

Parameters:
BlockId (Input)
The current child block.
BlockType (Input)
Type of block to be selected.
Refer to defines of PA_BLOCK_... for block types.

Function returned values:
PA_BLOCK_ID of the selected child block.
PA_NULL_BLOCK_ID will be returned if no block of the specified type found.

Function prototype:

```
PA_BLOCK_ID
PA_GetPreviousChildBlock (BlockId, BlockType)
PA_BLOCK_ID        BlockId;
    PA_BLOCK_TYPE     BlockType;
```

*Text Block Functions*

The following functions provide a detailed description of PA_BLOCK_TEXT blocks. A PA_BLOCK_TEXT block consists of smaller text line blocks. PA_BLOCK_TEXT blocks are important in OCR-related applications.

PA_ExtractTextLineImageByte2D

PA_ExtractTextLineImageByte2D extracts the bitmap image of a text line block into a 2-D byte-per-pixel array. A 2-D byte-per-pixel array is defined as an array of pointers. Each pointer points to an array of unsigned char which representing a single row of the image. The user is responsible for allocating and freeing the required space. The minimum required size of the destination bitmap can be determined by calling the PA_GetTextLineBoundary function.

```
Parameters:
    BlockId          (Input)
            The block to be extracted.
    SourceImageInfoPtr (Input)
            Points to a structure containing data such as
pointer
            to the image and other image size information.
    DestImagePtr2    (Output)
            2-D array for the extracted image.

Function returned values:
    PA_SUCCESS  (0)
    > 0      If any error occurred.

Function prototype:

    PA_ERR
    PA_ExtractTextLineImageByte2D (BlockId,
                                    SourceImageInfoPtr,
DestImagePtr2)
        PA_BLOCK_ID       BlockId;
        RBM_RAW_BITMAP   *SourceImageInfoPtr;
        unsigned char   **DestImagePtr2;
```

PA_GetFirstTextLine

PA_GetFirstTextLine returns the first text line block of a text block.

Parameters:

BlockId (Input)

The text block.

Function returned values:

PA_BLOCK_ID of the selected text line block.

PA_NULL_BLOCK_ID will be returned if input block is a PA_BLOCK_NON_TEXT block.

Function prototype:

```
PA_BLOCK_ID
PA_GetFirstTextLine (BlockId)
   PA_BLOCK_ID       BlockId;
```

PA_GetLastTextLine

PA_GetLastTextLine returns the last text line block of a text block.

Parameters:

BlockId (Input)

The text block.

Function returned values:

PA_BLOCK_ID of the selected text line block.

PA_NULL_BLOCK_ID will be returned if input block is a PA_BLOCK_NON_TEXT block.

Function prototype:

```
PA_BLOCK_ID
PA_GetLastTextLine (BlockId)
   PA_BLOCK_ID       BlockId;
```

PA_GetNextTextLine

PA_GetNextTextLine returns the next text line block of the current text line block. Note that the next text line block is on the same level as the current text line block.

Parameters:
BlockId (Input)
The current text line block.

Function returned values:
PA_BLOCK_ID of the selected text line block.
PA_NULL_BLOCK_ID will be returned if no block found.

Function prototype:

```
PA_BLOCK_ID
PA_GetNextTextLine (BlockId)
   PA_BLOCK_ID        BlockId;
```

PA_GetNumberOfTextLinesInBlock

PA_GetNumberOfTextLinesInBlock returns the number of text line blocks of a text block.

Parameters:
BlockId (Input)
The text block.

Function returned values:
Number of text line blocks.
0 will be returned if the input block is a PA_BLOCK_NON_TEXT block.

Function prototype:

```
PA_BLOCK_ID
PA_GetNumberOfTextLinesInBlock (BlockId)
   PA_BLOCK_ID        BlockId;
```

PA_GetPreviousTextLine

PA_GetPreviousTextLine returns the previous text line block of the current text line block. Note that the previous text line block is on the same level as the current text line block.

```
Parameters:
   BlockId          (Input)
           The current text line block.

Function returned values:
   PA_BLOCK_ID of the selected text line block.
   PA_NULL_BLOCK_ID will be returned if no block found.

Function prototype:

   PA_BLOCK_ID
   PA_GetPreviousTextLine (BlockId)
      PA_BLOCK_ID       BlockId;
```

PA_GetTextLineBoundary

PA_GetTextBoundary returns the boundary information of a text line block.

```
Parameters:
   BlockId          (Input)
           The text line block.
   BoundaryPtr      (Output)
           (Address of) The boundary structure.

Function returned values:
   PA_SUCCESS  (0)
   >0       If any error occurred.

Function prototype:

   PA_ERR
   PA_GetTextLineBoundary (BlockId, BoundaryPtr)
      PA_BLOCK_ID       BlockId;
      RBM_RECTANGLE    *BoundaryPtr;
```

*Table Functions*

PA_GetFirstTableCell

PA_GetFirstTableCell returns the first table cell block of a specified type of a table block.

Parameters:
BlockId (Input)
The table block.
BlockType (Input)
Type of block to be selected.
Refer to defines of PA_BLOCK_... for block types.

Function returned values:
PA_BLOCK_ID of the selected table cell block.
PA_NULL_BLOCK_ID will be returned if no block of the specified type found.

Function prototype:

```
PA_BLOCK_ID
PA_GetFirstTableCell (BlockId, BlockType)
   PA_BLOCK_ID       BlockId;
   PA_BLOCK_TYPE     BlockType;
```

PA_GetIthTableCell

PA_GetIthTableCell returns the table cell block at the specified cell position in a text block.

Parameters:
BlockId (Input)
The table block.
Order (Input)
The cell position (one dimension) in the table block.

Function returned values:
PA_BLOCK_ID of the table cell block.

PA_NULL_BLOCK_ID will be returned if the order is out of range.

Function prototype:

```
PA_BLOCK_ID
PA_GetIthTableCell (BlockId, Order)
   PA_BLOCK_ID       BlockId;
   int               Order;
```

PA_GetLastTableCell

PA_GetLastTableCell returns the last table cell block of a specified type of a table block.

Parameters:

```
BlockId          (Input)
        The table block.
BlockType        (Input)
        Type of block to be selected.
        Refer to defines of PA_BLOCK_... for block types.
```

Function returned values:

PA_BLOCK_ID of the selected table cell block.

PA_NULL_BLOCK_ID will be returned if no block of the specified type found.

Function prototype:

```
PA_BLOCK_ID
PA_GetLastTableCell (BlockId, BlockType)
   PA_BLOCK_ID       BlockId;
   PA_BLOCK_TYPE     BlockType;
```

PA_GetNextTableCell

PA_GetNextTableCell returns the next table cell block of a specified type of the current table cell block. Note that the next table cell block is on the same level as the current table cell block.

Parameters:
BlockId (Input)
The current table cell block.
BlockType (Input)
Type of block to be selected.
Refer to defines of PA_BLOCK_... for block types.

Function returned values:
PA_BLOCK_ID of the selected table cell block.
PA_NULL_BLOCK_ID will be returned if no block of the specified type found.

Function prototype:

```
PA_BLOCK_ID
PA_GetNextTableCell (BlockId, BlockType)
   PA_BLOCK_ID       BlockId;
   PA_BLOCK_TYPE     BlockType;
```

PA_GetNumberOfCellsInTable

PA_GetNumberOfCellsInTable returns the number of table cell blocks of the specified block type of a table block.

Parameters:
BlockId (Input)
The table block.
BlockType (Input)
Type of block to be selected.
Refer to defines of PA_BLOCK_... for block types.

Function returned values:
Number of children blocks.
0 will be returned if the input block is not a PA_BLOCK_TABLE block.

Function prototype:

```
int
```

```
PA_GetNumberOfCellsInTable (BlockId, BlockType)
   PA_BLOCK_ID        BlockId;
   PA_BLOCK_TYPE      BlockType;
```

PA_GetPreviousTableCell

PA_GetPreviousTableCell returns the previous table cell block of a specified type of the current table cell block. Note that the previous table cell block is on the same level as the current table cell block.

```
Parameters:
   BlockId          (Input)
          The current table cell block.
   BlockType        (Input)
          Type of block to be selected.
          Refer to defines of PA_BLOCK_... for block types.

Function returned values:
   PA_BLOCK_ID of the selected table cell block.
   PA_NULL_BLOCK_ID will be returned if no block of the
specified type found.

Function prototype:

   PA_BLOCK_ID
   PA_GetPreviousTableCell (BlockId, BlockType)
      PA_BLOCK_ID        BlockId;
      PA_BLOCK_TYPE      BlockType;
```

*Line Functions*

The following function is provided for PA_BLOCK_LINE blocks.

PA_GetLineInfo

PA_GetLineInfo returns a structure of line information such as line type, line attribute, line slant angle, etc.

Parameters:
BlockId (Input)
The line block.
LineInfoPtr (Output)
(Address of) The line info structure.
Please refer to PA_LINE_INFO for details. If the input block is not a PA_BLOCK_LINE block, an error PA_ERR_BLOCK_NOT_LINE will be returned. If the returned slant angle is zero, it means that the line is straight horizontally or vertically (depends on the line type).

Function returned values:
PA_SUCCESS
PA_ERR_BLOCK_NOT_LINE

Function prototype:

```
PA_ERR
PA_GetLineInfo (BlockId, LineInfoPtr)
   PA_BLOCK_ID       BlockId;
   PA_LINE_INFO     *LineInfoPtr;
```

*Picture Functions*

The following function is provide for PA_BLOCK_PICT blocks.

PA_GetPictureInfo

PA_GetPictureInfo returns a structure of picture information such as picture type.

Parameters:

BlockId (Input)
The picture block.
PictInfoPtr (Output)
(Address of) The picture info structure. Please refer to PA_PICT_INFO for details. If the input block is not a PA_BLOCK_PICT block, an error PA_ERR_BLOCK_NOT_PICT will be returned.

Function returned values:
PA_SUCCESS
PA_ERR_BLOCK_NOT_PICT

Function prototype:

```
PA_ERR
PA_GetPictureInfo (BlockId, PictInfoPtr)
   PA_BLOCK_ID       BlockId;
   PA_PICT_INFO     *PictInfoPtr;
```

What is claimed is:

1. An application programming interface for accessing page analysis functionality of a block selection program and for accessing data structures resulting therefrom, comprising:

plural page analysis functionality which manipulate block selection functions, including functions to analyze a document page in order to identify text regions, non-text regions and bitmap image regions in the document page, to create a hierarchical tree structure corresponding to the analyzed document page, and to return a pointer to a root node of the analyzed page; and plural hierarchical tree structure accessing functions for traversing the hierarchical tree structure, and for locating desired nodes in the hierarchical tree structure.

2. An application programming interface according to claim 1, wherein the plural hierarchical tree structure accessing functions further include a function to return at least one pointer to at least one desired node.

3. An application programming interface according to claim 1, further comprising plural node interrogating functions for interrogating the at least one pointer to obtain attribute information of the at least one desired node corresponding thereto.

4. An application programming interface according to claim 3, wherein the plural node interrogating functions comprise text block interrogating functions, said text block interrogating functions including process steps to return a pointer to a first text line in a desired text block, to return a pointer to a last text line of the desired text block, return a pointer to a next text line in the desired text block, to return a number of text lines in the desired text block, to return a pointer to a previous text line in the desired text block, to return boundary information of a text line in the desired text block, and to extract a two-dimensional array of the bitmap image of the text line in the desired text block.

5. The application programming interface according to claim 3, wherein the plural node interrogating functions comprise picture block interrogating functions, said picture block interrogating functions including process steps to return information regarding picture type of desired picture block.

6. An application programming interface according to claim 3, further comprising a data file, said data file including definitions and parameters which are utilized by the plural page analysis functionality to manipulate block selection functions, by the plural hierarchical tree structure accessing functions to traverse the hierarchical tree, and to locate desired nodes, and by the plural node interrogating functions for interrogating the desired nodes.

7. An application programming interface according to claim 3, wherein the plural node interrogating functions comprise line block interrogating functions, said line block interrogating functions including process steps to return information regarding line type and other attributes of a desired line block.

8. An application programming interface according to claim 1, wherein the plural page analysis functionality comprises an initialization function to initialize the block selection program by setting internal variables and by allocating memory for processing and storing results thereof, an execution function for executing the block selection program on an input document image, and a termination function to free allocated memory set by the initialization function and to terminate the execution function.

9. An application programming interface according to claim 3, wherein the plural hierarchical tree structure accessing functions comprise a node relationship function which includes process steps for interrogating a relationship among nodes and for indicating how deeply nested a node is within the tree, a text node function which includes process steps for interrogating at least one node representing a text block, a table node function for interrogating at least one node representing a table block, a picture function for returning a type of picture represented by a picture node, and a line function for returning a type of line and other attributes represented by a line node.

10. An application programming interface according to claim 9, wherein the table node function includes process steps to return a pointer to a first table cell block of a specified table block, to return a table cell of a specified cell position in a table block, to return a pointer to a last table cell block of a specified table block, to return a next table cell block of a specified current table cell block, to return a number of table cell blocks of a specified block type of a table block, and to return a pointer to a previous table cell block of a specified current table cell block.

11. An application programming interface according to any of claims 2–4, wherein the returned pointer is a block identification.

12. A method of utilizing a page analysis API to create a page analysis program for accessing page analysis functionality of a block selection program and for accessing data structure resulting therefrom, the method comprising the steps of:

storing, in memory, plural page analysis functionality which manipulate block selection functions, including functions to analyze a document page in order to identify text regions, non-text regions and bitmap image regions in the document page, to create a hierarchical tree structure corresponding to the analyzed document page, and to return a pointer to a root node of the hierarchical tree structure which represents the analyzed page, and also storing in memory plural hierarchical tree structure accessing functions for traversing the tree and for locating desired nodes in the tree;

selecting, from memory, at least one of the plural page analysis functionality and at least one of the plural hierarchical tree structure accessing functions; and combining the at least one of the plural page analysis functionality selected and the at least one of the plural hierarchical tree structure accessing functions selected so as to create the page analysis program, whereby the created page analysis program is capable of accessing page analysis functionality of a block selection program and is capable of accessing a hierarchical tree structure resulting therefrom.

13. A method of utilizing a page analysis API to create a page analysis program according to claim 12, wherein the created page analysis program is also capable of returning at least one pointer to at least one desired node.

14. A method of utilizing a page analysis API to create a page analysis program according to claim 12, further comprising the steps of storing, in memory, plural data files which include data files which are associated with the plural page analysis functionality, and the plural hierarchical tree accessing functions, and combining at least one of the plural data files associated with the at least one selected plural page analysis functionality and combining at least one of the plural data files associated with the at least one selected plural hierarchical tree structure accessing function.

15. An application programming interface for accessing page analysis functionality of a block selection program and for accessing data structures resulting therefrom, comprising:

plural page analysis functionality which manipulate block selection functions including functions to analyze a document page, to create a hierarchical tree structure corresponding to the analyzed document page, and to return a pointer to a root node of the analyzed page;

plural hierarchical tree structure accessing functions for traversing the hierarchical tree structure, and for locating desired nodes in the hierarchical tree structure; and plural node interrogating functions for interrogating the at least one pointer to obtain attribute information of the at least one desired node corresponding thereto, wherein the plural node interrogating functions comprise text block interrogating functions, said text block interrogating functions including process steps to return a pointer to a first text line in a desired text block, to return a pointer to a last text line of the desired text block, return a pointer to a next text line in the desired text block, to return a number of text lines in the desired text block, to return a pointer to a previous text line in the desired text block, to return boundary information of a text line in the desired text block, and to extract a two-dimensional array of the bitmap image of the text line in the desired text block.

16. An application programming interface for accessing page analysis functionality of a block selection program and for accessing data structures resulting therefrom, comprising:

plural page analysis functionality which manipulate block selection functions including functions to analyze a document page, to create a hierarchical tree structure corresponding to the analyzed document page, and to return a pointer to a root node of the analyzed page;

plural hierarchical tree structure accessing functions for traversing the hierarchical tree structure, and for locating desired nodes in the hierarchical tree structure; and plural node interrogating functions for interrogating the at least one pointer to obtain attribute information of the at least one desired node corresponding thereto, wherein the plural node interrogating functions comprise picture block interrogating functions, said picture block interrogating functions including process steps to return information regarding picture type of desired picture block.

17. An application programming interface for accessing page analysis functionality of a block selection program and for accessing data structures resulting therefrom, comprising:

plural page analysis functionality which manipulate block selection functions including functions to analyze a document page, to create a hierarchical tree structure corresponding to the analyzed document page, and to return a pointer to a root node of the analyzed page;

plural hierarchical tree structure accessing functions for traversing the hierarchical tree structure, and for locating desired nodes in the hierarchical tree structure; and plural node interrogating functions for interrogating the at least one pointer to obtain attribute information of the at least one desired node corresponding thereto, wherein the plural hierarchical tree structure accessing functions comprise a node relationship function which includes process steps for interrogating a relationship among nodes and for indicating how deeply nested a node is within the tree, a text node function which includes process steps for interrogating at least one node representing a text block, a table node function for interrogating at least one node representing a table block, a picture function for returning a type of picture represented by a picture node, and a line function for returning a type of line and other attributes represented by a line node.

* * * * *